(12) United States Patent
Maguire et al.

(10) Patent No.: US 10,050,879 B2
(45) Date of Patent: Aug. 14, 2018

(54) TECHNIQUES FOR SELECTING CONTENT BASED ON NETWORK CONDITIONS

(71) Applicant: Facebook, Inc., Menlo Park, CA (US)

(72) Inventors: Yael Maguire, Boston, MA (US); Damian Kowalewski, Sunnyvale, CA (US); Giovanni Coglitore, Saratoga, CA (US); Aaron Samuel Bernstein, San Carlos, CA (US)

(73) Assignee: FACEBOOK, INC., Menlo Park, CA (US)

( * ) Notice: Subject to any disclaimer, the term of this patent is extended or adjusted under 35 U.S.C. 154(b) by 0 days.

(21) Appl. No.: 15/658,569

(22) Filed: Jul. 25, 2017

(65) Prior Publication Data

US 2017/0324658 A1 Nov. 9, 2017

Related U.S. Application Data

(63) Continuation of application No. 14/339,087, filed on Jul. 23, 2014, now Pat. No. 9,749,233, which is a continuation-in-part of application No. 14/286,873, filed on May 23, 2014, now Pat. No. 9,877,185.

(60) Provisional application No. 61/877,644, filed on Sep. 13, 2013.

(51) Int. Cl.
| | |
|---|---|
| *H04M 3/00* | (2006.01) |
| *H04L 12/721* | (2013.01) |
| *H04L 12/26* | (2006.01) |
| *H04W 12/04* | (2009.01) |
| *H04L 12/729* | (2013.01) |
| *H04L 12/727* | (2013.01) |

(52) U.S. Cl.
CPC ............ *H04L 45/70* (2013.01); *H04L 43/08* (2013.01); *H04L 45/121* (2013.01); *H04L 45/125* (2013.01); *H04W 12/04* (2013.01)

(58) Field of Classification Search
None
See application file for complete search history.

(56) References Cited

U.S. PATENT DOCUMENTS

| | | | | |
|---|---|---|---|---|
| 2013/0065557 | A1* | 3/2013 | Zhang | H04W 12/06 455/411 |
| 2013/0173756 | A1* | 7/2013 | Luna | H04L 43/0876 709/219 |
| 2014/0003261 | A1* | 1/2014 | Glllett | H04W 48/04 370/252 |

* cited by examiner

*Primary Examiner* — Idowu O Osifade

(57) ABSTRACT

Techniques for smart data routing are described. A system may include a storage module configured to store network conditions for a plurality of networks and locations and a server device. The server device may be configured to determine network conditions for each of a plurality of networks and locations based upon detected usage of at least one mobile application being accessed via each of the plurality of networks and in each of the locations. Determined network conditions may be stored at the storage module. The server may be further configured to receive a request for a communication from a client device. Based upon at least the determined network conditions, the server may be configured to determine routing information for the communication. Once determined, the server may be configured to provide the routing information for the communication to the client device.

20 Claims, 13 Drawing Sheets

US 10,050,879 B2

TECHNIQUES FOR SELECTING CONTENT BASED ON NETWORK CONDITIONS

RELATED APPLICATION

This application is a continuation of, claims the benefit of and priority to, previously filed U.S. patent application Ser. No. 14/339,087 filed Jul. 23, 2014, entitled "Techniques For Smart Data Routing," which is a continuation in part of U.S. patent application Ser. No. 14/286,873 filed May 23, 2014, entitled "Techniques for Phone Number and Data Management," which claims the benefit of priority to U.S. Provisional Application No. 61/877,644, filed Sep. 13, 2013 entitled "Techniques for Phone Number and Data Management," all of which are hereby incorporated by reference in their entireties.

BACKGROUND

A client device, such as a mobile telephone, may include one or more subscriber identity module (SIM), either physical or virtual, which may store information such as an integrated circuit card identifier (ICCID), international mobile subscriber identify (IMSI), authentication keys, local area identity (LAI), operator specific emergency number, short message service center number (SMSC), user phone number, service provider name (SPN), service dialing numbers (SDN), advice-of-charge parameters, value added service (VAS) applications, and mobile network codes (MNC). In addition, a SIM may include SMS messages and contact information.

Client devices with multiple SIMs may be able to access different networks, since each SIM is typically be associated with a different network. Based on time, location, or other factors, communications using each network may have varying performance and cost. While users of a client device may manually switch between multiple SIMs, it may be difficult for a user to determine which SIM should be used to maximize performance and minimize cost. Thus, a desire exists to improve the information made available to a client device such that the user, or the client device itself, may optimally select a SIM for a particular communication.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

Various embodiments are generally directed to techniques for smart data routing. Some embodiments are particularly directed to techniques for smart data routing in a social networking environment when members of the social network may use one or more SIMs with a client device. In an embodiment, a system may include a storage module configured to store network conditions for a plurality of networks and locations and a server device. The server device may be configured to determine network conditions for each of a plurality of networks and locations based upon detected usage of at least one mobile application being accessed via each of the plurality of networks and in each of the locations. Determined network conditions may be stored at the storage module. The server may be further configured to receive a request for a communication from a client device. Based upon at least the determined network conditions, the server may be configured to determine routing information for the communication. Once determined, the server may be configured to provide the routing information for the communication to the client device.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Figure 1:
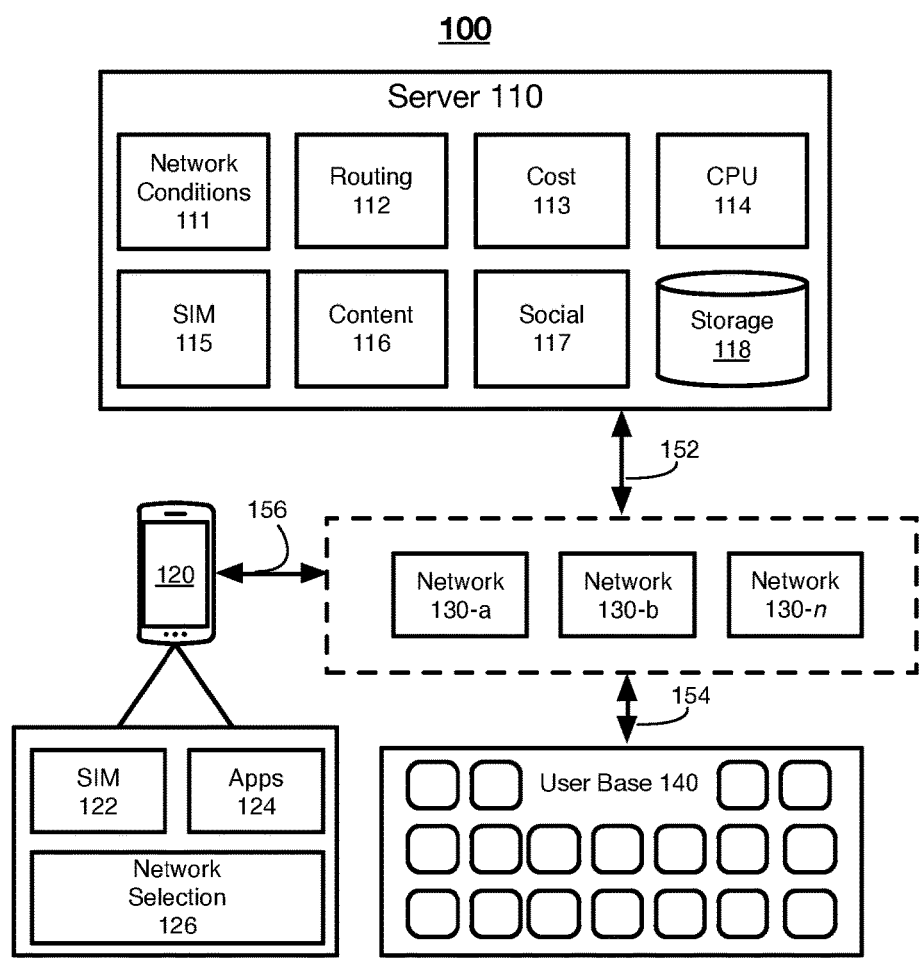
FIG. 1 illustrates an embodiment of a system.

Various embodiments are generally directed to techniques for smart data routing for client devices of users of an online service, such as a social network or messaging application, for example. Some embodiments are particularly directed to techniques for providing routing information based upon network conditions and cost information to a client device, allowing the client device to select an optimal route for communications. In an embodiment, a system may include a storage module configured to store network conditions for a plurality of networks and locations and a server device. The server device may be configured to determine network conditions for each of a plurality of networks and locations based upon detected usage of at least one mobile application being accessed via each of the plurality of networks and in each of the locations. Determined network conditions may be stored at the storage module. The server may be further configured to receive a request for a communication from a client device. Based upon at least the determined network conditions, the server may be configured to determine routing information for the communication. Once determined, the server may be configured to provide the routing information for the communication to the client device.

With general reference to notations and nomenclature used herein, the detailed descriptions which follow may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

FIG. 1 illustrates a block diagram for a system 100. In one embodiment, the system 100 may comprise one or more components. Although the system 100 shown in FIG. 1 has a limited number of elements in a certain topology, it may be appreciated that the system 100 may include more or less elements in alternate topologies as desired for a given implementation. The system 100 may include a plurality of client devices, including client device 120 and user base 140 including a plurality of client devices, which may be generally operative to interact with server 110 over network interfaces 152, 154, and 156. Client device 120 and each client device of user base 140 may include one or more processing units, storage units, network interfaces, or other hardware and software elements described in more detail below. Examples of network interfaces that may be used by client devices 120, user base 140, and server 110 are set forth in more detail herein.

In an embodiment, network interfaces 152, 154, and 156 may connect various components of system 100 via networks 130-a-n, which may include one or more of the networks described herein. It is worthy to note that "a" and "b" and "n" and similar designators as used herein are intended to be variables representing any positive integer. Thus, for example, if an implementation sets a value for n=5, then a complete set of networks 130 may include networks 130-1, 130-2, 130-3, 130-4 and 130-5. The embodiments are not limited in this context. In an example, networks 130 may include wireless voice and data networks, such as GSM, CDMA, LTE, or other networks described herein, and may be used to connect client device 120 and/or user base 140 with server 110 via network interfaces 152, 154, and 156.

In an embodiment, client device 120 and each client device of user base 140 may comprise without limitation a mobile computing device, a smart phone, a cellular telephone, a handset, a personal digital assistant, a one-way pager, a two-way pager, a messaging device, a computer, a personal computer (PC), a desktop computer, a laptop computer, a notebook computer, a handheld computer, a tablet computer, or a wearable computing device such as a smart watch. Server 110 may comprise without limitation a server, a server array or server farm, a web server, a network server, an Internet server, a work station, a mini-computer, a mainframe computer, a supercomputer, a network appliance, a web appliance, multiprocessor systems, processor-based systems, or any combination thereof.

In various embodiments, client device 120, user base 140, and server 110 may comprise or implement multiple components or modules. As used herein the terms "component" and "module" are intended to refer to computer-related entities, comprising either hardware, a combination of hardware and software, software, or software in execution. For example, a component and/or module can be implemented as a process running on a processor, a hard disk drive, multiple storage drives (of optical and/or magnetic storage medium), an object, an executable, a thread of execution, a program, and/or a computer. By way of illustration, both an application running on a server and the server can be a component and/or module. One or more components and/or modules can reside within a process and/or thread of execution, and a component and/or module can be localized on one computer and/or distributed between two or more computers as desired for a given implementation. The embodiments are not limited in this context.

The various devices within system 100, and components and/or modules within a device of system 100, may be communicatively coupled via various types of communications media as indicated by various lines or arrows, such as network interfaces 152, 154, and 156, for example. The devices, components and/or modules may coordinate operations between each other. The coordination may involve the uni-directional or bi-directional exchange of information. For instance, the devices, components and/or modules may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections within a device include parallel interfaces, serial interfaces, and bus interfaces. Exemplary connections between devices may comprise network connections over a wired or wireless communications network.

In various embodiments, client device 120, user base 140, and server 110 of the system 100 may be organized as a distributed system. A distributed system typically comprises multiple autonomous computers that communicate through a computer network, such as one or more of networks 130. The computers may interact with each other in order to achieve a common goal, such as solving computational problems. For example, a computational problem may be divided into many tasks, each of which is solved by one computer. A computer program that runs in a distributed system is called a distributed program, and distributed programming is the process of writing such programs. Examples of a distributed system may include, without limitation, a client-server architecture, a 3-tier architecture, an N-tier architecture, a tightly-coupled or clustered architecture, a peer-to-peer architecture, a master-slave architecture, a shared database architecture, and other types of distributed systems. It is worthy to note that although some embodiments may utilize a distributed system when describing various enhanced techniques for data retrieval, it may be appreciated that the enhanced techniques for data retrieval may be implemented by a single computing device as well. The embodiments are not limited in this context.

As mentioned above, client device 120 and each client device of user base 140 may include a memory and processor, and may include one or more storage and processing components in some cases. In an embodiment, client device 120 may include one or more applications (apps) 124. Likewise, each client device of user base 140 may also include one or more apps (not shown). Apps 124 may include, but are not limited to, native mobile applications, web applications, desktop software applications, or any combination thereof. Examples of applications may include social networking applications, newsreader applications, photography applications, video applications, media applications, search applications, games, e-reading applications, or the like. Apps 124 may communicate over network interfaces 152, 154, and 156 with server 110, and in some cases, communicate using one or more of a plurality of SIMs of client device 120 chosen based upon routing information received from server 110. In some embodiments, apps 124 and apps executing on client devices of user base 140 may share information regarding network conditions and/or the location of client device 120 with server 110. Further, server 110 may determine network condition information or the location of client device 120 based upon communications with apps 124.

In various embodiments, client device 120 may include SIM module 122. SIM module 122 may be configured to manage one or more SIMs, real or virtual, on a client device, and to share SIM information with one or more modules of server 110. Client device 120 may include a storage area (not shown) for information associated with each SIM, which may be physical or virtual. This storage area may be a protected area of flash or a dedicated IC for multi-SIM management. SIM information may include at least a minimum amount of information required to operate the client device on a mobile network. For example, SIM information may include an ICCID, IMSI, authentication keys, LAI, operator specific emergency number, SMSC, user phone number, SPN, SDN, advice-of-charge parameters, VAS applications, and MNC. In addition, SIM information may include SMS messages and contact information.

Upon detection of a new SIM, selection of a new virtual SIM, or a request from server 110, SIM module 122 may contact a SIM module 115 of server 110 and transfer SIM information, such as private key data and IMSI, for example. Of course, any combination of the SIM information discussed above may be transferred based upon a particular implementation. Further, the communication of SIM information between a client device and a server is discussed in more detail below with respect to FIGS. 7 and 8. SIM module 115 may store SIM information associated with each user and/or client device associated with server 110. The transfer of SIM information from SIM module 122 to SIM module 115 allows SIMs used by client device 120 to be identified to server 110 such that server 110 may determine routing information for communications and communications from client device 120 may be optimized accordingly. In an embodiment, SIM module 122 may be automatically configured to switch between SIMs based upon routing information received from server 110, or provide an indication to a user of an optimized SIM to manually select. As discussed in more detail below, SIM module 122 may be configured to switch between one or more SIMs of client device 120 based upon instructions from network selection module 126.

In some embodiments, client device 120 may include network selection module 126, which may be configured to communicate with server 110 via networks 130. Network selection module 126 may communicate with server 110, which may utilize one or more modules to determine an optimized network route using a variety of criteria. Such criteria may include detected network conditions, location, cost, content, and social information. In particular, network selection module 126 may be configured to request routing information from routing module 112 of server 110. A request for routing information may include information about a desired communication and the location of a client device. In an example, a request for routing information may include the type of message, such as SMS, MMS, voice call, or social networking application message, and recipient information. Further, a request for routing information may include the current location of a client device.

Various embodiments may provide routing information to network selection module 126 immediately prior to establishing a communication, or periodically. For example, routing information may be requested prior to initiating a communication such that a communication may be initiated using a SIM that is optimized for one of a variety of factors, including network conditions, location, cost, content, and social information. Further, network selection module 126 may periodically request and receive routing information from routing module 112. In one example, routing information for a particular geographic area may be requested by network selection module. In this manner, routing information may be stored by network selection module 126 and may be used to initiate a communication without requesting routing information from routing module 112 immediately prior.

In some embodiments, routing information may include various information identifying a network or SIM associated with a network that should be used to optimize communications from client device 120. For example, routing information may include identification of a network that has been determined to be performing optimally in a particular location. Based upon SIM information stored by module 115, server 110 may be aware of the networks currently available to client device 120. In this manner, a network may be chosen and shared using routing information. Routing information may further include an optimal type of communication, such as SMS, MMS, voice call, or social networking application message, which may be chosen based upon a variety of criteria, including cost of the communication and speed of the communication. Network selection module 126 may utilize received routing information to instruct SIM module 122 to choose an optimal SIM for the desired communication.

Server 110 may include storage component 118 and processor component 114, which each may comprise one more of the storage components and processor components described herein. In some embodiments, server 110 may include routing module 112, which may be stored on storage component 118 and operative on processor component 114 to perform smart data routing operations. In particular, routing module 112 may be configured to provide routing information, which may be used by server 110 or a client device, such as client device 120, to route communications—voice, data, or otherwise—based upon a variety of criteria, such as performance or cost. In some embodiments, routing information may include various information identifying a network or SIM associated with a network that should be used to optimize communications from client device 120. For example, routing information may include identification of a network that has been determined to be performing optimally, based upon performance and/or cost, in a particular location. Based upon SIM information stored by module 115, server 110 may be aware of the networks currently available to client device 120. In this manner, a network may be chosen and shared using routing information. Routing information may further include an optimal type of communication, such as SMS, MMS, voice call, or social networking application message, which may be chosen based upon a variety of criteria, including cost of the communication, speed of the communication, and information about the recipient of the communication.

Routing module 112 may utilize information from one or more other modules to determine routing information. For example, routing module 112 may request information from network conditions module 111, cost module 113, SIM module 115, content module 116, and/or social module 117. The information available from each of these modules is discussed further below. Using information from the above modules, routing module 112 may determine routing information for each client device. In an example, a user of a client device may choose among one or more criteria such as performance or cost. Routing information may then be determined by routing module 112 to optimize performance, or minimize cost.

In various embodiments, routing module 112 may provide routing information upon request from a client device, or may periodically provide routing information to a client device, either in response to periodic requests to, or communications initiated by routing module 112 based upon various criteria. In some cases, a client device may request routing information prior to initiating a communication. For example, when using an application to initiate communication, the application may send a request for routing information to routing module 112 prior to initiating the communication. In this manner, the communication may be initiated in a manner that is optimized based upon the most current data available to server 110. In other cases, routing module 112 may periodically send routing information to client devices so that routing information is already locally available to the client device when a communication is initiated. Routing module 112 may periodically send routing information to a client device based upon various criteria, such as a time schedule, a detected location of a client device, or current network availability of a client device, for example.

As set forth above, various criteria may be used by routing module 112 to determine when to send updated routing information to a client device. In one example, routing module 112 may send routing information to a client device based upon a time schedule, either determined by routing module 112, or by a client device. In an embodiment, a user of a client device may be provided settings to select a schedule for receiving routing information from routing module 112, such as once every two hours in one example. Thus, a client device may periodically request routing information based upon a schedule, or the schedule may be shared with routing module 112 such that routing module 112 may automatically send periodic updates of routing information.

In another example, routing module 112 may determine that a client device has traveled outside of a location radius, and may provide updated routing information to the client device for a new detected location of the client device.

Routing module 112 may store a record of previous routing information sent to a particular client device, which may be associated with a particular location. When a client device has traveled outside of a location associated with previously received routing information, routing module 112 may be configured to send updated routing information associated with a detected location of the client device. In an embodiment, a client device may itself detect that locally stored routing information is associated with a location outside of a current location radius. In this situation, client device may request updated routing information. For example, a network selection module, such as network selection module 126 of client device 120, may send a request for routing information including a current location of a client device to routing module 112.

In yet another example, routing module 112 may determine that a client device is currently connected to a preferred high-speed and/or low-cost, network, such as Wi-Fi. In this case, routing information may be sent to a client device as to optimize the transfer of information for performance and/or cost. Routing module 112 or client device 120 may detect that a preferred high-speed and/or low cost network is currently available to client device 120. When new routing information is desirable, i.e. routing information on client device 120 is out of date or associated with a location outside of a current location radius, and a preferred network is available, client device 120 or routing module 112 may provide updated routing information.

In some embodiments, server 110 may include network conditions module 111, which may be stored on storage component 118 and operative on processor component 114 to perform network conditions operations. Network conditions module 111 may be configured to determine network condition information for one or more of networks 130 and for one or more locations and share determined network condition information with routing module 112. For example, network conditions module may communicate with apps module 124 of client device 120 via network interfaces 156 and 152. Likewise, applications on client devices of user base 140 may communicate with network conditions module 111 via network interface 154. In some embodiments, network conditions module 111 may be configured to determine network condition information such as quality of services parameters, error rates, bandwidth, throughput, transmission delay, availability, or jitter. Further, it can be appreciated that other network condition information may be determined in addition to that listed above.

In various embodiments, network conditions module 111 may determine network condition information by monitoring communications to and from one or more client devices. Network conditions may be determined based upon detected performance of communications of applications, such as one or more of apps 124. Client devices of user base 140 may also include applications, which may be subject to communication monitoring. Network conditions module may monitor data sent from server 110 to one or more client devices and associate detected network condition information, such as quality of services parameters, error rates, bandwidth, throughput, transmission delay, availability, or jitter, with detected locations of one or more client devices. In this manner, network conditions module 111 may maintain current network conditions information for a plurality of networks and locations. In some cases, an application, such as a social networking application, may have many millions or billions of users. Thus, network condition information may be widely available for many networks and locations.

In some embodiments, server 110 may include cost module 113, which may be stored on storage component 118 and operative on processor component 114 to perform cost operations. Cost module 113 may maintain cost information related to networks 130. For example, cost module 113 may periodically determine the cost for voice calls on a particular network. A similar determination may be made with respect to a variety of communications, such as SMS, MMS, and data communications, for example, and for each of a plurality of networks 130. Cost information shared from cost module 113 to routing module 112 may be used to minimize the cost for communication from a client device, to a recipient device, or to minimize the net cost of a communication when taking into account the originating client device and all recipient client devices. In some embodiments, a combination of network condition information and cost information may be used by routing module 112 to determine routing information.

In an embodiment, server 110 may include SIM module 115, which may be stored on storage component 118 and operative on processor component 114 to perform SIM operations. In an example, SIM module 115 may be configured to receive SIM information from one or more of client devices 120 and/or user base 140. Received SIM information may be stored by SIM module 115 in storage component 118. SIM information may include at least a minimum amount of information required to operate the client device on a mobile network. For example, SIM information may include an ICCID, IMSI, authentication keys, LAI, operator specific emergency number, SMSC, user phone number, SPN, SDN, advice-of-charge parameters, VAS applications, and MNC. In addition, SIM information may include SMS messages and contact information. SIM information may be made available to routing module 112 such that SIM information associated with a client device may be taken into account when determining routing information for a communication. For example, if a client device has access to three SIMs, routing module 112 may consider three networks associated with the three SIMs and determine routing information that optimizes performance and/or cost.

In some embodiments, server 110 may include content module 116, which may be stored on storage component 118 and operative on processor component 114 to perform content management operations. Content module 116 may be configured to use information from the various modules of server 110 to determine content to send from server 110 to a client device. For example, content module 116 may utilize network conditions information from network conditions module 111, cost information from cost module 113, SIM information from SIM module 115, social information from social module 117, and/or routing information from routing module 112 to determine content to send to one or more client devices. Content may include advertising content, media content (e.g., audio, video, text, etc.), social network content, messaging content, gaming content, or any other content that may be requested from server 110 by a client device 120, or selected by server 110 to push to client device 120. In one example, content may include a newsfeed of a social network that includes many types of content including, but not limited to, text, hyperlinks, audio, video, and images.

It may be desirable to select content that optimizes the user experience, which may include sending lower quality content that loads faster and costs less for the user based upon known network conditions and cost information. In many cases, alternative content may be chosen or generated to lower demands on a network, or reduce data costs. For example, a video advertisement may be served in a lower quality version, or newsfeed content may be chosen to include more text and less images. If user is using a particular SIM with high cost, lower quality content may be delivered. In addition, when network performance is high and cost is low, rich, high-quality content may be selected to enrich the user experience of a mobile application. Further, when network performance is high and cost is low, content module 116 may instruct client device 120 to cache high quality content that may be used when costs rise or network conditions deteriorate.

In some embodiments, content module 116 may be responsible for managing content to be delivered to one or more client devices. For example, as previously discussed, communications from a client device may be routed using different SIMs and networks based upon determined network conditions and costs. In the context of mobile messaging, for example, some messages, such as SMS or MMS, may be associated with a particular SIM or network. Thus, as network conditions and costs change, messages sent and received from the same client device may be associated with multiple SIMs. Content module 116 may use SIM information from SIM 115 to consolidate messages associated with multiple SIMs with a common client device. In this manner, messages may be ordered properly and consolidated, even if messages from a common conversation are associated with multiple SIMs In another example, content module 116 may determine to send content to one or more client devices using a plurality of networks. In an embodiment, content may initially begin to be sent using a first network based upon determined network conditions and costs. Thus, a first portion of content may be sent on a first network. Based upon updated information regarding network conditions or costs, content module 116 may be configured to determine that a second network should be used to send a second portion of content to one or more client devices. Thus, a second network may be used to deliver a second portion of content. While two portions of content are described, it can be appreciate that content may be split into more than two portions and may be delivered according to the embodiments described herein using more than two networks. Further, content may be split into many portions and be delivered using more or less networks than portions of content. In this manner, content module 116 may be configured to switch between a number of networks for each portion of content to optimize performance and cost, as described herein.

In some embodiments, server 110 may include social module 117, which may be stored on storage component 118 and operative on processor component 114 to perform social network operations. Social module 117 may be configured to determine social information based upon a social graph, which is discussed below with respect to FIG. 13, such that communications to other users may be optimized. For example, multiple users of a service may have one or more SIMs registered with the service. Social module may be configured to provide social information to routing module 112 so that routing module 112 may recommend routes based upon SIMs currently being used by recipients within an originating user's social graph, or based upon information stored about a recipient user's usage habits. For example, when a user prefers to use a particular SIM at night, and a message is sent to the night SIM during the day, social module 117 may provide social information to routing module 112, based upon privacy settings available to all users, informing routing module 112 to generate routing information based upon currently used SIM information.

Further, routing information may be generated as to choose a network that is common with one or more recipients. In this manner, cost may be decreased by taking advantage of free calling or messaging between users of a common network.

Figure 2:
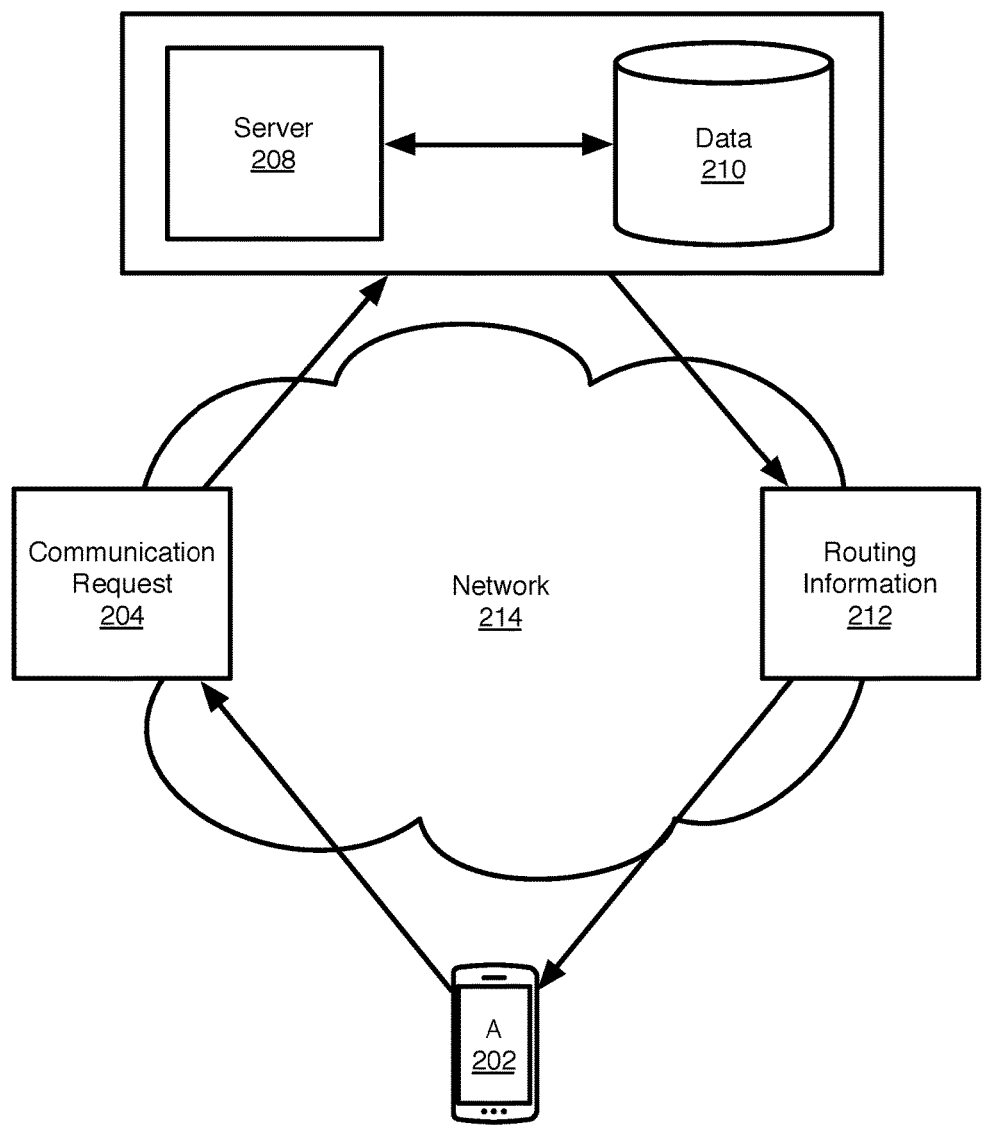
FIG. 2 illustrates an embodiment of a system.

FIG. 2 illustrates one embodiment of a system 200, which may be representative of some or all of the operations executed by one or more embodiments described herein. System 200 may include server 208 and data store 210, which may be similar to server 110 and storage 118, respectively. Server 208 and data store 210 may be connected to a client device 202 via network 214. A client device 202, which may be similar to that described herein with respect to FIG. 1, may be used by a User A to communicate with the user of another client device, User B. For example, User A may use an application on client device 202 to send a SMS message, data message, social networking message, or other communication such as a voice call to another client device associated with User B.

Prior to initiating, or otherwise sending a communication to User B, an application on User A's client device 202 may request routing information from a social network or other service, including server 208 and central storage 210. Central storage 210 may store one or more modules as discussed with respect to FIG. 1, including but not limited to, a network conditions module, routing module, cost module, SIM module, content module, and social module, for example. In an embodiment, information from one or more modules may be used to generate routing information 212, which may be sent in response to communication request 204, or may be pushed by server 208, as described with respect to FIG. 1. For example, prior to initiating a communication, a communication request 204 may be sent from client device 202, and routing information 212 may be returned in response. Further, routing information 212 may be sent periodically, or in response to a variety of criteria, such as detected network conditions or location, as discussed above. In any event, routing information 212 may be used by client device 202 to optimally route communications.

Figure 3:
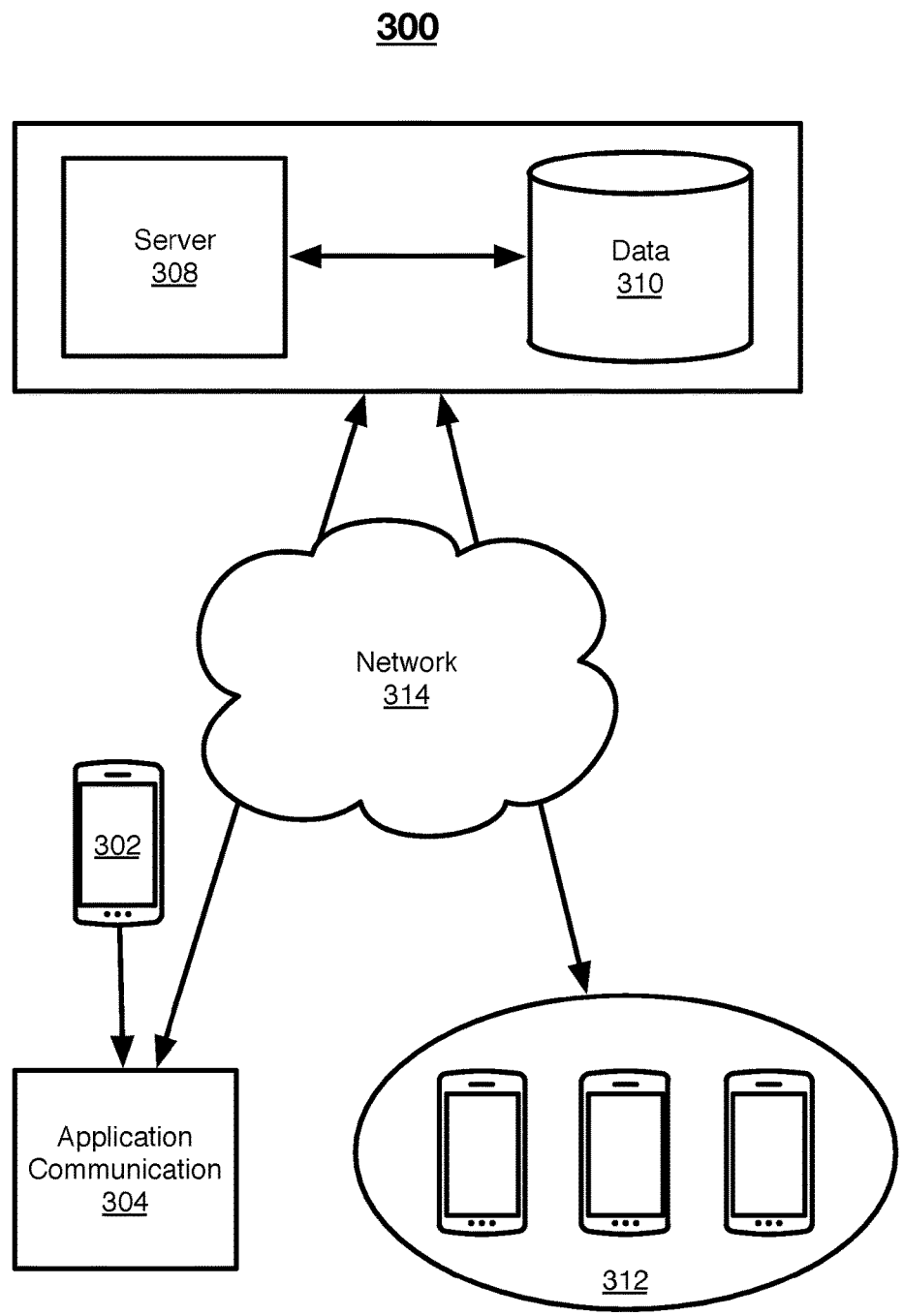
FIG. 3 illustrates an embodiment of a system.

FIG. 3 illustrates an embodiment of a system 300, which may be representative of some or all of the operations executed by one or more embodiments described herein. System 300 may include server 308 and data store 310, which may be similar to server 110 and storage 118, respectively. Server 308 and data store 310 may be connected to a client device 302 and a user base of client devices 312 via network 314. In an embodiment, client device 302 may communicate with server 308 via network 314 via an application communication 304 Likewise, one or more client devices from user base may communicate with server 308 via network 314. In an exemplary embodiment, server 308 may include one or more modules, such as network conditions module 111, that may use application communication 304, or other application communications from client devices of user base 312, to determine network conditions for network 314 in a plurality of locations. It can be appreciated that, while network 314 is illustrated, additional networks may be used to communicate with server 308.

In some embodiments, a network conditions module of server 308 may be configured to determine network condition information such as quality of services parameters, error rates, bandwidth, throughput, transmission delay, availability, or jitter, from application communication 304. In addition, location information associated with client device 302 may be obtained via application communication 304. Location information may be stored in data store 310 and associated with detected network conditions such that a routing module may determine routing information for a client device based, at least in part, on detected network conditions for a given location of a client device.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 4:
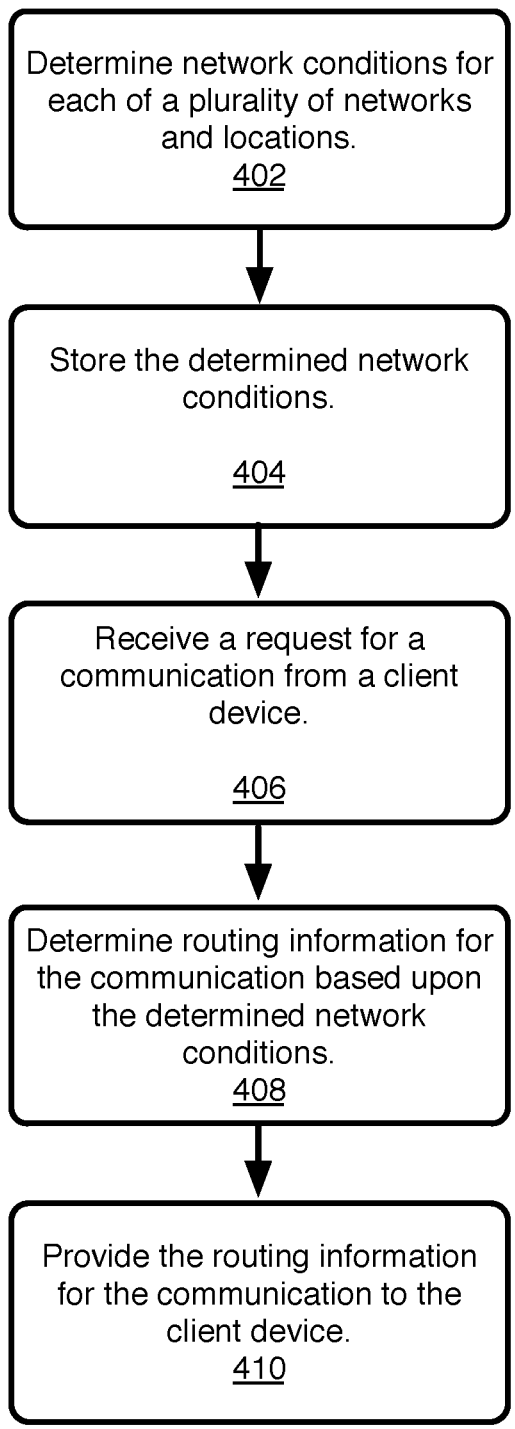
FIG. 4 illustrates an embodiment of a logic flow.

FIG. 4 illustrates one embodiment of a logic flow 400. The logic flow 400 may be representative of some or all of the operations executed by one or more embodiments described herein. At 402, a server device may determine network conditions for each of a plurality of networks and locations. As discussed above, a network conditions module of a server may utilize communications between the server and one or more client devices to determine network condition information associated with each of a plurality of locations. In some embodiments, network condition information may include quality of services parameters, error rates, bandwidth, throughput, transmission delay, availability, or jitter. Determined network conditions may be stored at 404.

At 406, a request may be received for routing information. The request may be received from a client device prior to initiating a communication, may be sent based upon a periodic request schedule, or may be sent from a client device because routing information stored locally has become out of date, or is no longer relevant due to an updated location of the client device. In any event, the request for routing information may include information regarding an intended communication, such as the type of communication, size of the communication, and recipient of the communication. The location of the client device may also be included in a request for routing information.

At 408, routing information may be determined based upon at least the determined network conditions. Of course, other information may be used to determine routing information, such as cost information, content information, SIM information, and social information, all discussed above with respect to FIG. 1.

At 410, determined routing information may be provided to a client device and a network selection module of the client device may choose an appropriate SIM to initiate a communication based upon the received routing information. Further, a communication may be modified based upon received routing information. In an example, a SMS message to a recipient may be changed to a different number also associated with the same recipient, which may be due to routing information indicating that the recipient is using a different SIM than originally thought.

Figure 5:
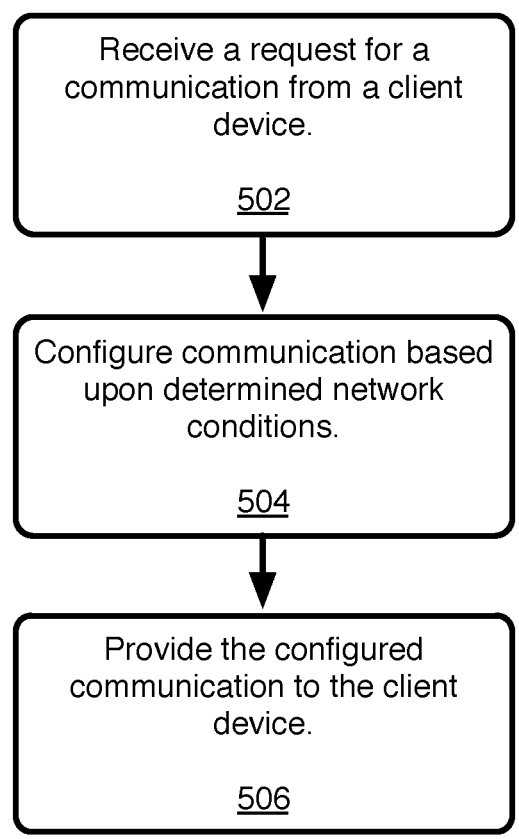
FIG. 5 illustrates an embodiment of a logic flow.

FIG. 5 illustrates one embodiment of a logic flow 500. The logic flow 500 may be representative of some or all of the operations executed by one or more embodiments described herein. At 502, a request for communication may be received at a server from a client device. In an embodiment, a request for communication may be a request for content from a server. Content may include advertising content, media content, social network content, messaging content, gaming content, or any other content that may be requested from a server by a client device, or selected by a server to push to a client device. In one example, content may include a newsfeed of a social network that includes many types of content including, but not limited to, text, hyperlinks, audio, video, and images. A content module of the server may be configured to select content to provide to a client device based upon detected network conditions for the location of the client device.

At 504, a communication from the server may be configured based upon determined network conditions. As discussed above with respect to FIG. 1, a content module may configure content to be communicated from the server to the client device. A content module, such as content module 116, may be configured to use information from various modules of the server to determine content to send from the server to the client device. For example, a content module may utilize network conditions information from a network conditions module, cost information from a cost module, SIM information from a SIM module, social information from a social module, and/or routing information from a routing module to determine content to send to one or more client devices.

It may be desirable to select content that optimizes the user experience, which may include sending lower quality content that loads faster and costs less for the user based upon known network conditions and cost information. In many cases, alternative content may be chosen or generated to lower demands on a network, or reduce data costs. For example, a video advertisement may be served in a lower quality version, or newsfeed content may be chosen to include more text and less images. If user is using a particular SIM with high cost, lower quality content may be delivered. In addition, when network performance is high and cost is low, rich, high-quality content may be selected to enrich the user experience of a mobile application. Further, when network performance is high and cost is low, a content module may instruct client device to cache high quality content that may be used when costs rise or network conditions deteriorate. At 506, the configured communication may be provided from the server to the client device.

Figure 6:
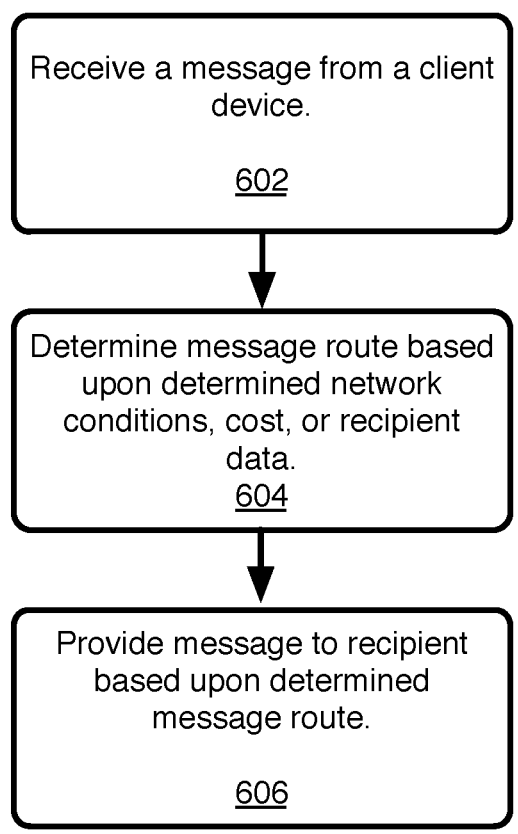
FIG. 6 illustrates an embodiment of a logic flow.

FIG. 6 illustrates one embodiment of a logic flow 600. The logic flow 600 may be representative of some or all of the operations executed by one or more embodiments described herein. In particular, logic flow 600 illustrates an embodiment in which a server device may receive a message from a client device and may route the message to one or more recipients based upon at least determined network conditions, cost, or recipient data. At 602, a message may be received from a client device. A message may include a data message to one or more recipients, and may include text, audio, video, or images, for example.

At 604, a server, based upon determined network conditions, cost, and/or recipient information, may determine a message route. For example, network conditions information from a network conditions module, cost information from a cost module, or social and SIM information related to a recipient from social and SIM modules may be used to determine a message route. The route of a message may be chosen as to maximize performance and minimize cost, either to the sender of a message, the recipient of a message, or both. In an embodiment, a message may be received by the server, which may contain a large image file, or other data. In this exemplary embodiment, the server may determine that the message will be delivered fastest and with minimal cost using a route including a particular SIM for the recipient. Thus, the server may forward the message using a route to the particular SIM for the recipient at 606.

Figure 7:
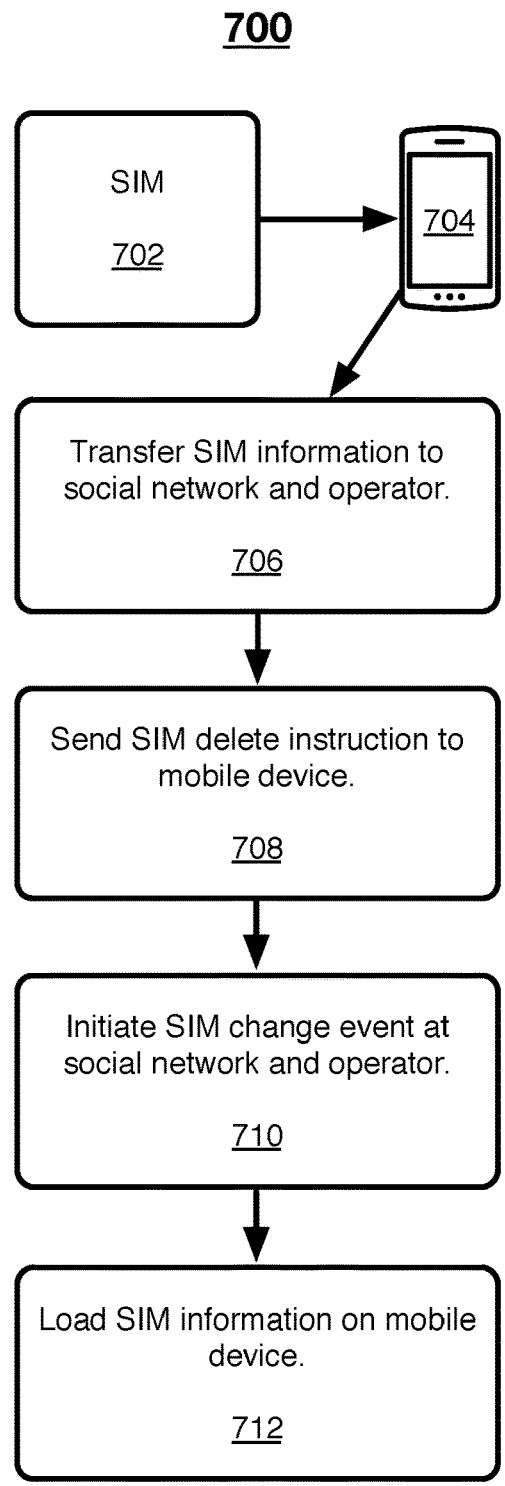
FIG. 7 illustrates an embodiment of a logic flow.

FIG. 7 illustrates one embodiment of a logic flow 700, which may be representative of some or all of the operations executed by one or more embodiments described herein. In particular, logic flow 700 may be representative of some or all of the operations executed by SIM module 122 and SIM module 115 of system 100, discussed above with respect to FIG. 1. Logic flow 700 at block 706 may transfer SIM information to a social network and/or operator. A SIM 702 may be inserted into client device 704. Client device 704 may include a storage area for one or more SIM card data sets, which may be physical or virtual. This storage area may be a protected area of flash or a dedicated IC for multi-SIM management. Each SIM card data set may include at least a minimum amount of information required to operate the client device on a mobile network. Further, a user interface may be provided to the user to switch between virtual SIMs. Upon detection of a new SIM or selection of a new virtual SIM, an application running on client device 704 may contact both a mobile network operator and/or a social network or other service over a network connection, which may include cellular or Wi-Fi data connection, and transfer SIM information, such as private key data and IMSI, for example. A SIM module of a remote server may associate SIM information with client device 704 such that routing information for communications from client device 704 may be determined.

Logic flow 700 at block 708 may send a SIM delete instruction to client device 704, which may instruct the device to delete some or all information from the SIM. In this manner, the SIM data may erased from the SIM card and may only be temporarily accessible by the mobile operator and social network, thus providing a safeguard against copying or reusing SIMs. Further, since the mobile operator may be aware of all SIM changes and capable of managing acquired SIM information, the mobile operator may not be opposed to users using multiple SIMs in a single client device.

Logic flow 700 at block 710 initiates a SIM change event at one or both of the social network and mobile operator. The SIM change event may trigger an update to one or more databases indicating that a new SIM has been entered into the client device of a user. Further, the update may indicate that a particular SIM is to be loaded into a storage area of a client device. In this manner, the mobile operator and social network may keep track of a user's current SIM information and may utilize it to generate routing information for optimized communications from a user's client device.

Logic flow 700 at block 712 loads SIM information onto client device 704. SIM information may be stored in a storage area for one or more SIM card data sets. Each SIM card data set may include at least a minimum amount of information required to operate the client device on a mobile network. For example, a SIM card data set may include an integrated circuit card identifier (ICCID), international mobile subscriber identity (IMSI), authentication keys, local area identity (LAI), operator specific emergency number, short message service center number (SMSC), user phone number, service provider name (SPN), service dialing numbers (SDN), advice-of-charge parameters, value added service (VAS) applications, and mobile network codes (MNC).

In an embodiment, client device 704 may include multiple SIM data sets. In this manner, a user may switch between multiple SIMs on a single device without the need of multi-SIM hardware. Further, since the SIMs may be managed at the network level by the mobile operator and social network, SIM information associated with each client device may be used to generate optimized routing information for communications as described above with respect to FIG. 1.

In some embodiments, client device 704 may include one or more applications for switching between SIM data sets. Further, a network selection module may receive routing information from a routing module and may switch between SIMs based upon a usage scenario. In an embodiment, a particular SIM may be chosen based upon whether the user is making a phone call, texting, using a data connection, or based upon the application used for a communication. Further, a particular SIM data set may be used based upon an amount of voice minutes or data usage remaining on a phone plan associated with a SIM data set. Still further, a particular SIM may be chosen based upon a network operator of a contact that is to be contacted by client device 704. For example, some mobile operators offer free minutes between client devices on the same network. Accordingly, a SIM that is associated with a mobile network operator used by the contact that is to be contacted by the client device 704 is chosen. Similarly, mobile operators may offer different data pricing tariffs at different points in time and for different uses. Accordingly, a SIM may be selected to minimize the data cost for the given time and/or use.

In an embodiment, a particular application, such as a messaging application, photo application, calling application, or VoIP application may be chosen for an action based upon a variety of factors. Factors may include which SIM data set has been chosen, a type of network connection that is available, or identification of an application used by a person to be contacted, for example.

In some embodiments, a user interface may be provided to indicate to a user when a SIM data set has been changed. Further, using the user interface, a user may select one or preferences related to switching between SIM data sets. Such preferences may include using a particular SIM data set for predefined actions such as calls, texts, or data. Further, a user may define preferences for SIM data sets to be used with particular contacts, subsets of a social graph, or certain times of time day, for example.

Figure 8:
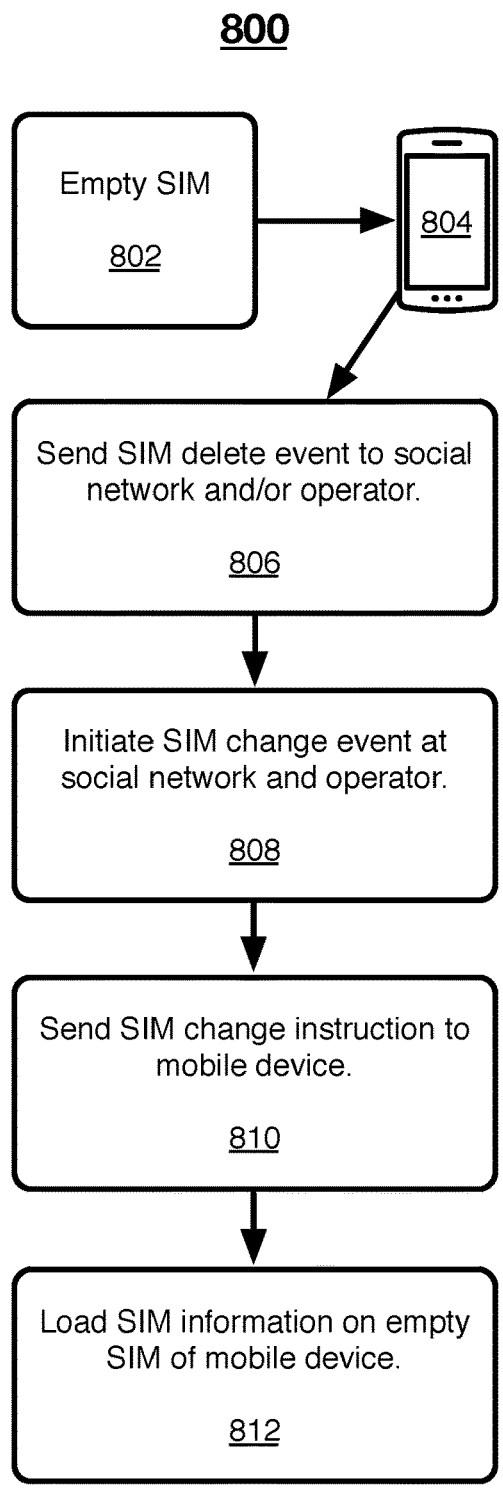
FIG. 8 illustrates an embodiment of a logic flow.

FIG. 8 illustrates one embodiment of a logic flow 800. Logic flow 800 may be representative of some or all of the operations executed by one or more embodiments described herein. In particular, logic flow 800 may be representative of some or all of the operations executed by SIM module 122 and SIM module 115 of system 100, discussed above with respect to FIG. 1. Logic flow 800 at block 806 may send a SIM delete event to a social network and/or operator. In an embodiment, an empty SIM 802 may be inserted into client device 804 and a SIM delete event may be sent to a social network and network operating, confirming that the SIM is empty. An empty SIM 802 may also be indicative of a brand new device being added to the network by a user of a social networking system. Client device 804 may include a storage area for one or more SIM card data sets. Each SIM card data set may include at least a minimum amount of information required to operate the client device on a mobile network. Further, a user interface may be provided to the user to switch between virtual SIMs. Upon detection of a new SIM, an application running on client device 804 may contact one of, or both of, a mobile network operator and a social network or other service over a network connection, which may include cellular or Wi-Fi data connection, and transfer SIM information, such as private key data and IMSI, or an empty status of the SIM, for example.

Logic flow 800 at block 808 initiates a SIM change event at one or both of the social network and mobile operator. The SIM change event may trigger an update to one or more databases indicating that a new SIM has been entered into the client device of a user. Further, the update may indicate that a particular SIM is to be loaded into a storage area of a client device. In this manner, the mobile operator and social network may keep track of a user's current SIM information and may utilize such SIM information to generate routing information for optimal communication from a client device.

Logic flow 800 at block 810 sends a SIM change instruction to client device 804, indicating that a SIM data set may be loaded on client device 804. SIM information may be stored in a storage area for one or more SIM card data sets, and in the case of an empty SIM, SIM information may be loaded onto a SIM from a mobile network operator, social network, or other service via a network connection at block 812. Each SIM card data set may include at least a minimum amount of information required to operate the client device on a mobile network. For example, a SIM card data set may include an ICCID, IMSI, authentication keys, LAI, operator specific emergency number, SMSC, user phone number, SPN, SDN, advice-of-charge parameters, VAS applications, and MNC.

Figure 9:
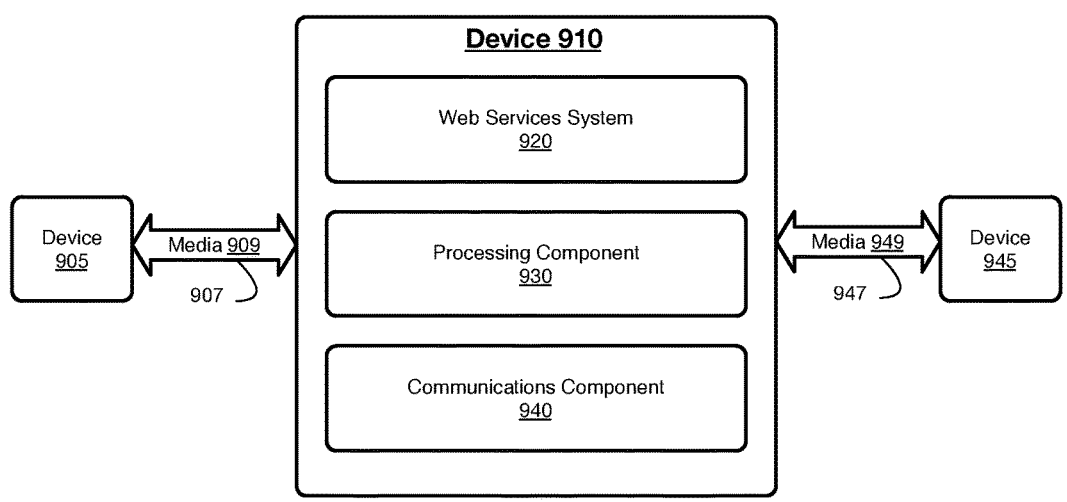
FIG. 9 illustrates an embodiment of a centralized system.

FIG. 9 illustrates a block diagram of a centralized system 900. The centralized system 900 may implement some or all of the structure and/or operations for the web services system 920 in a single computing entity, such as entirely within a single device 910.

The device 910 may comprise any electronic device capable of receiving, processing, and sending information for the web services system 920. Examples of an electronic device may include without limitation a client device, a personal digital assistant (PDA), a mobile computing device, a smart phone, a cellular telephone, ebook readers, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a network appliance, a web appliance, a distributed computing system, multiprocessor systems, processor-based systems, consumer electronics, programmable consumer electronics, game devices, television, set top box, wireless access point, base station, subscriber station, mobile subscriber center, radio network controller, router, hub, gateway, bridge, switch, machine, or combination thereof. The embodiments are not limited in this context.

The device 910 may execute processing operations or logic for the web services system 920 using a processing component 930. The processing component 930 may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as a desired computational rate, power levels, heat tolerances, processing cycle budget, input data rates, output data rates, memory resources, data bus speeds and other design or performance constraints, as desired for a given implementation.

The device 910 may execute communications operations or logic for the web services system 920 using communications component 940. The communications component 940 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 940 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 909, 949 include wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media.

The device 910 may communicate with other devices 905, 945 over a communications media 909, 949, respectively, using communications signals 907, 947, respectively, via the communications component 940. The devices 905, 945, may be internal or external to the device 910 as desired for a given implementation.

For example, device 905 may correspond to a client device such as a phone used by a user. Signals 907 sent over media 909 may therefore comprise communication between the phone and the web services system 920 in which the phone transmits a request and receives a web page or other data in response.

Device 945 may correspond to a second user device used by a different user from the first user, described above. In one embodiment, device 945 may submit information to the web services system 920 using signals 947 sent over media 949 to construct an invitation to the first user to join the services offered by web services system 920. For example, if web services system 920 comprises a social networking service, the information sent as signals 947 may include a name and contact information for the first user, the contact information including phone number or other information used later by the web services system 920 to recognize an incoming request from the user. In other embodiments, device 945 may correspond to a device used by a different user that is a friend of the first user on a social networking service, the signals 947 including status information, news, images, contact information, or other social-networking information that is eventually transmitted to device 905 for viewing by the first user as part of the social networking functionality of the web services system 920.

Figure 10:
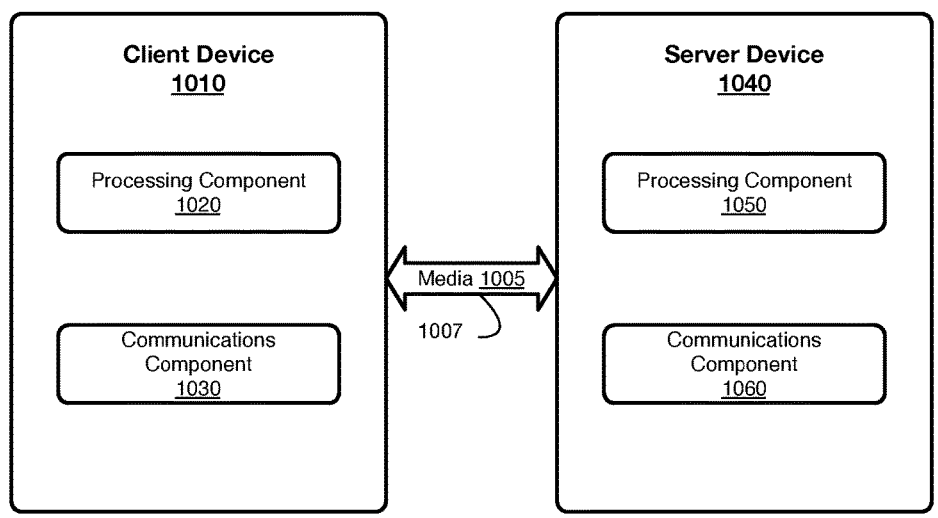
FIG. 10 illustrates an embodiment of a distributed system.

FIG. 10 illustrates a block diagram of a distributed system 1000. The distributed system 1000 may distribute portions of the structure and/or operations for the disclosed embodiments across multiple computing entities. Examples of distributed system 1000 may include without limitation a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

The distributed system 1000 may comprise a client device 1010 and a server device 1040. In general, the client device 1010 and the server device 1040 may be the same or similar to the client device 910 as described with reference to FIG. 9. For instance, the client system 1010 and the server system 1040 may each comprise a processing component 1020, 1050 and a communications component 1030, 1060 which are the same or similar to the processing component 930 and the communications component 940, respectively, as described with reference to FIG. 9. In another example, the devices 1010, 1040 may communicate over a communications media 1005 using communications signals 1007 via the communications components 1030, 1060.

The client device 1010 may comprise or employ one or more client programs that operate to perform various methodologies in accordance with the described embodiments. In one embodiment, for example, the client device 1010 may implement some steps described with respect to FIGS. 4 to 8.

The server device 1040 may comprise or employ one or more server programs that operate to perform various methodologies in accordance with the described embodiments. In one embodiment, for example, the server device 1040 may implement some steps described with respect to FIGS. 4 to 8.

Figure 11:
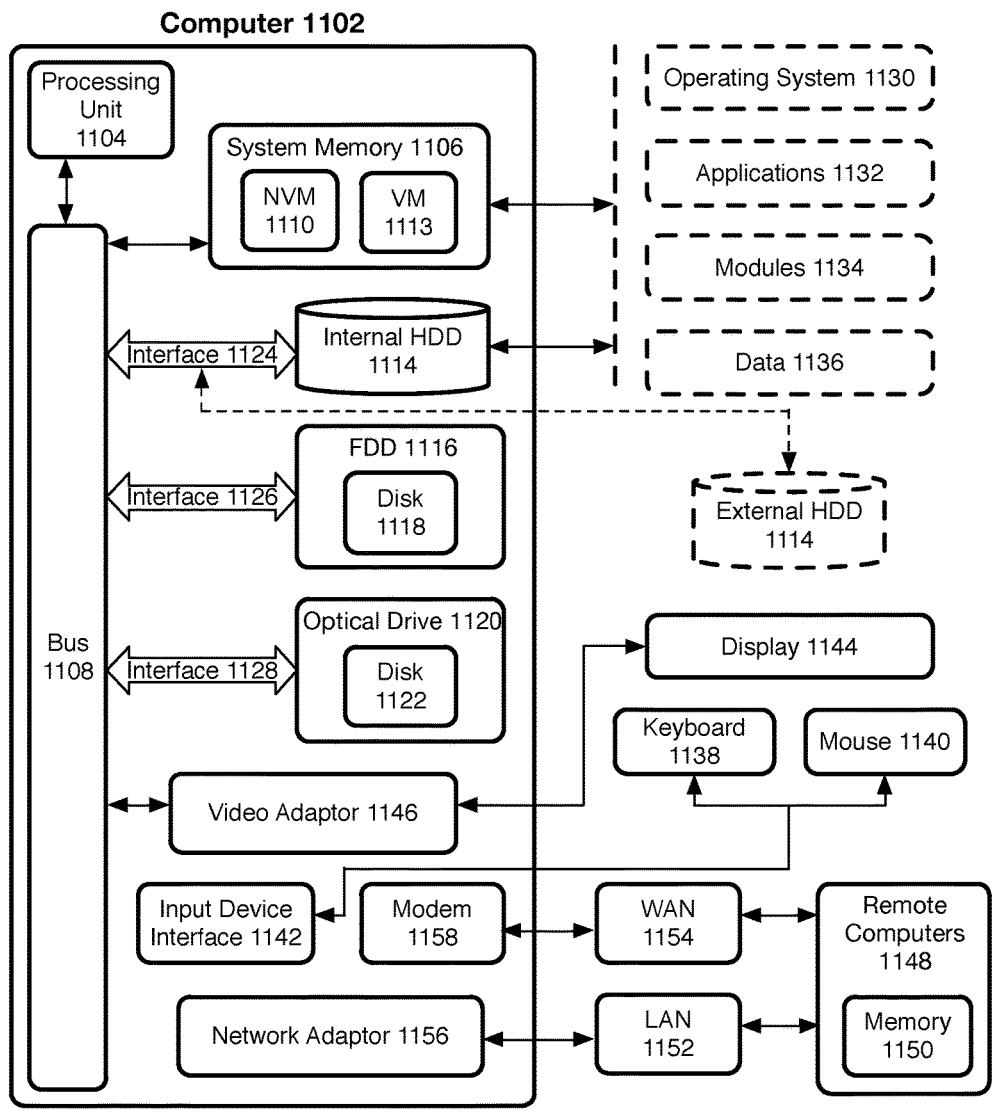
FIG. 11 illustrates an embodiment of a computing architecture.

FIG. 11 illustrates an embodiment of an exemplary computing architecture 1100 suitable for implementing various embodiments as previously described. In one embodiment, the computing architecture 1100 may comprise or be implemented as part of an electronic device. Examples of an electronic device may include those described herein. The embodiments are not limited in this context.

As used in this application, the terms "system" and "component" are intended to refer to a computer-related entity, either hardware, a combination of hardware and software, software, or software in execution, examples of which are provided by the exemplary computing architecture 1100. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 1100 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 1100.

As shown in FIG. 11, the computing architecture 1100 comprises a processing unit 1104, a system memory 1106 and a system bus 1108. The processing unit 1104 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 1104.

The system bus 1108 provides an interface for system components including, but not limited to, the system memory 1106 to the processing unit 1104. The system bus 808 can be any of several types of bus structure that may further interconnect to a memory bus (with or without a memory controller), a peripheral bus, and a local bus using any of a variety of commercially available bus architectures. Interface adapters may connect to the system bus 1108 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 1100 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 1106 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 11, the system memory 1106 can include non-volatile memory 1110 and/or volatile memory 1113. A basic input/output system (BIOS) can be stored in the non-volatile memory 1110.

The computer 1102 may include various types of computer-readable storage media in the form of one or more lower speed memory units, including an internal (or external) hard disk drive (HDD) 1114, a magnetic floppy disk drive (FDD) 1116 to read from or write to a removable magnetic disk 1118, and an optical disk drive 1120 to read from or write to a removable optical disk 1122 (e.g., a CD-ROM, DVD, or Blu-ray). The HDD 1114, FDD 1116 and optical disk drive 1120 can be connected to the system bus 1108 by a HDD interface 1124, an FDD interface 1126 and an optical drive interface 1128, respectively. The HDD interface 1124 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 1110, 1113, including an operating system 1130, one or more application programs 1132, other program modules 1134, and program data 1136. In one embodiment, the one or more application programs 1132, other program modules 1134, and program data 1136 can include, for example, the various applications and/or components to implement the disclosed embodiments.

A user can enter commands and information into the computer 1102 through one or more wire/wireless input devices, for example, a keyboard 1138 and a pointing device, such as a mouse 1140. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 1104 through an input device interface 1142 that is coupled to the system bus 1108, but can be connected by other interfaces such as a parallel port, IEEE 1394 serial port, a game port, a USB port, an IR interface, and so forth.

A display 1144 is also connected to the system bus 1108 via an interface, such as a video adaptor 1146. The display 1144 may be internal or external to the computer 1102. In addition to the display 1144, a computer typically includes other peripheral output devices, such as speakers, printers, and so forth.

The computer 1102 may operate in a networked environment using logical connections via wire and/or wireless communications to one or more remote computers, such as a remote computer 1148. The remote computer 1148 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1150 is illustrated. The logical connections depicted include wire/wireless connectivity to a local area network (LAN) 1152 and/or larger networks, for example, a wide area network (WAN) 1154. Such LAN and WAN networking environments are commonplace in offices and companies, and facilitate enterprise-wide computer networks, such as intranets, all of which may connect to a global communications network, for example, the Internet.

When used in a LAN networking environment, the computer 1102 is connected to the LAN 1152 through a wire and/or wireless communication network interface or adaptor 1156. The adaptor 1156 can facilitate wire and/or wireless communications to the LAN 1152, which may also include a wireless access point disposed thereon for communicating with the wireless functionality of the adaptor 1156.

When used in a WAN networking environment, the computer 1102 can include a modem 1158, or is connected to a communications server on the WAN 1154, or has other means for establishing communications over the WAN 1154, such as by way of the Internet. The modem 1158, which can be internal or external and a wire and/or wireless device, connects to the system bus 1108 via the input device interface 1142. In a networked environment, program modules depicted relative to the computer 1102, or portions thereof, can be stored in the remote memory/storage device 1150. It will be appreciated that the network connections shown are exemplary and other means of establishing a communications link between the computers can be used.

The computer 1102 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 12:
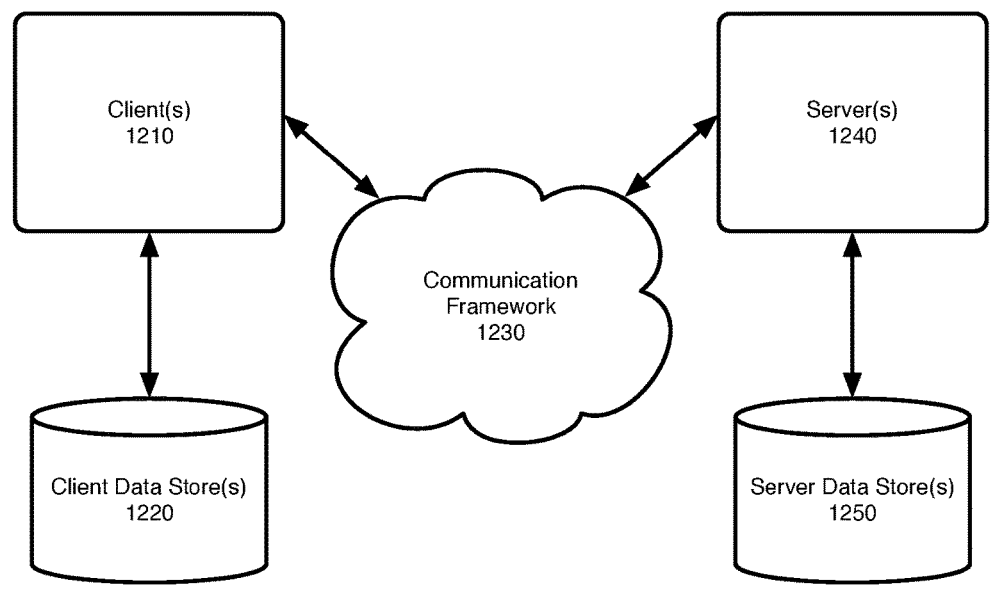
FIG. 12 illustrates an embodiment of a communications architecture.

FIG. 12 illustrates a block diagram of an exemplary communications architecture 1200 suitable for implementing various embodiments as previously described. The communications architecture 1200 includes various common communications elements, such as a transmitter, receiver, transceiver, radio, network interface, baseband processor, antenna, amplifiers, filters, power supplies, and so forth. The embodiments, however, are not limited to implementation by the communications architecture 1200.

As shown in FIG. 12, the communications architecture 1200 comprises includes one or more clients 1210 and servers 1240. The clients 1210 may implement the client device 1010, for example. The servers 1240 may implement the server device 1040, for example. The clients 1210 and the servers 1240 are operatively connected to one or more respective client data stores 1220 and server data stores 1250 that can be employed to store information local to the respective clients 1210 and servers 1240, such as cookies and/or associated contextual information.

The clients 1210 and the servers 1240 may communicate information between each other using a communication framework 1230. The communications framework 1230 may implement any well-known communications techniques and protocols. The communications framework 1230 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 1230 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 1210 and the servers 1240. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Figure 13:
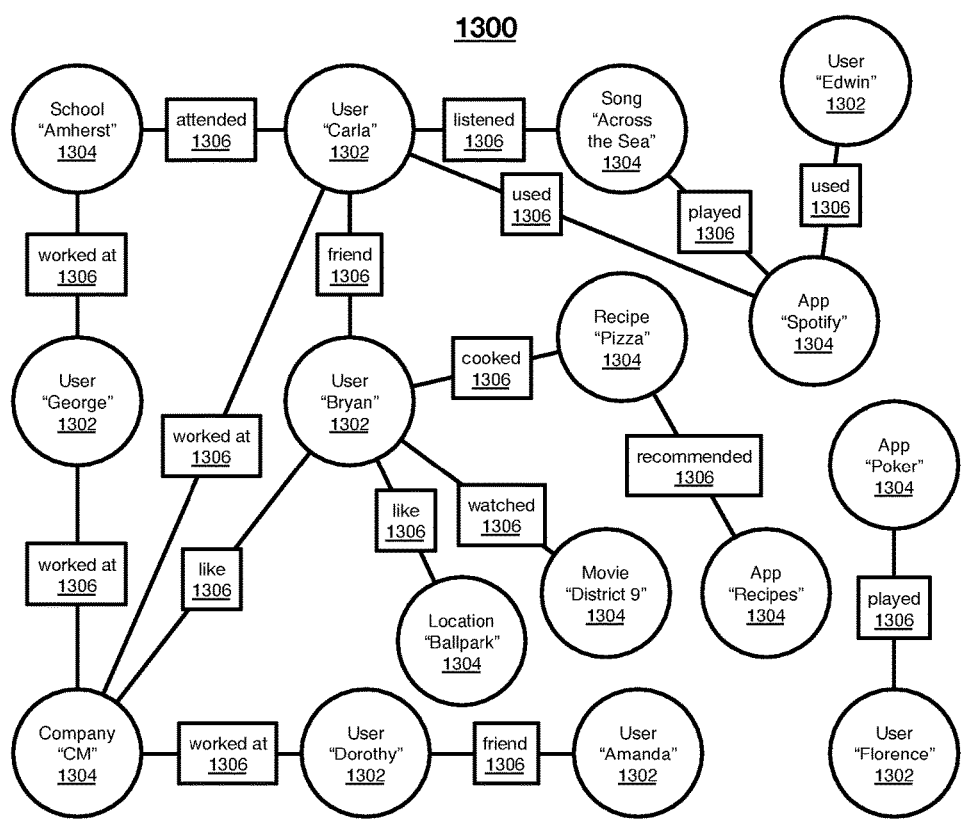
FIG. 13 illustrates an embodiment of a social graph.

FIG. 13 illustrates an example of a social graph 1300. In one or more of the embodiments described herein, a social graph may be accessed and data therefrom may be preloaded into a device, or accessed using user information preloaded into a device. In particular embodiments, a social-networking service may store one or more social graphs 1300 in one or more data stores. In particular embodiments, social graph 1300 may include multiple nodes, which may include multiple user nodes 1302 and multiple concept nodes 1304. Social graph 1300 may include multiple edges 1306 connecting the nodes. In particular embodiments, a social-networking service, client system, third-party system, or any other system or device may access social graph 1300 and related social-graph information for suitable applications. The nodes and edges of social graph 1300 may be stored as data objects, for example, in a data store (such as a social-graph database). Such a data store may include one or more searchable or queryable indexes of nodes or edges of social graph 1300, which may be used in some embodiments to generate social information that may be used to generate routing information, as described above.

In particular embodiments, a user node 1302 may correspond to a user of the social-networking service. As an example and not by way of limitation, a user may be an individual (human user), an entity (e.g., an enterprise, business, or third-party application), or a group (e.g., of individuals or entities) that interacts or communicates with or over the social-networking service. In particular embodiments, when a user registers for an account with the social-networking service, the social-networking service may create a user node 1302 corresponding to the user, and store the user node 1302 in one or more data stores. Users and user nodes 1302 described herein may, where appropriate, refer to registered users and user nodes 1302 associated with registered users. In addition or as an alternative, users and user nodes 1302 described herein may, where appropriate, refer to users that have not registered with the social-networking service. In particular embodiments, a user node 1302 may be associated with information provided by a user or information gathered by various systems, including the social-networking service. As an example and not by way of limitation, a user may provide their name, profile picture, contact information, birth date, sex, marital status, family status, employment, education background, preferences, interests, or other demographic information. In particular embodiments, a user node 1302 may be associated with one or more data objects corresponding to information associated with a user. In particular embodiments, a user node 1302 may correspond to one or more webpages.

In particular embodiments, a concept node 1304 may correspond to a concept. As an example and not by way of limitation, a concept may correspond to a place (such as, for example, a movie theater, restaurant, landmark, or city); a website (such as, for example, a website associated with the social-network service or a third-party website associated with a web-application server); an entity (such as, for example, a person, business, group, sports team, or celebrity); a resource (such as, for example, an audio file, video file, digital photo, text file, structured document, or application) which may be located within the social-networking service or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 904 may be associated with information of a concept provided by a user or information gathered by various systems, including the social-networking service. As an example and not by way of limitation, information of a concept may include a name or a title; one or more images (e.g., an image of the cover page of a book); a location (e.g., an address or a geographical location); a website (which may be associated with a URL); contact information (e.g., a phone number, SIM information as described above, or an email address); other suitable concept information; or any suitable combination of such information. In particular embodiments, a concept node 1304 may be associated with one or more data objects corresponding to information associated with concept node 1304. In particular embodiments, a concept node 1304 may correspond to one or more webpages.

In particular embodiments, a node in social graph 1300 may represent or be represented by a webpage (which may be referred to as a "profile page"). Profile pages may be hosted by or accessible to the social-networking service. Profile pages may also be hosted on third-party websites associated with a third-party server. As an example and not by way of limitation, a profile page corresponding to a particular external webpage may be the particular external webpage and the profile page may correspond to a particular concept node 904. Profile pages may be viewable by all or a selected subset of other users. As an example and not by way of limitation, a user node 902 may have a corresponding user-profile page in which the corresponding user may add content, make declarations, or otherwise express himself or herself. As another example and not by way of limitation, a concept node 1304 may have a corresponding concept-profile page in which one or more users may add content, make declarations, or express themselves, particularly in relation to the concept corresponding to concept node 1304.

In particular embodiments, a concept node 1304 may represent a third-party webpage or resource hosted by a third-party system. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client system to send to the social-networking service a message indicating the user's action. In response to the message, the social-networking service may create an edge (e.g., an "eat" edge) between a user node 1302 corresponding to the user and a concept node 1304 corresponding to the third-party webpage or resource and store edge 1306 in one or more data stores.

In particular embodiments, a pair of nodes in social graph 1300 may be connected to each other by one or more edges 1306. An edge 1306 connecting a pair of nodes may represent a relationship between the pair of nodes. In particular embodiments, an edge 1306 may include or represent one or more data objects or attributes corresponding to the relationship between a pair of nodes. As an example and not by way of limitation, a first user may indicate that a second user is a "friend" of the first user. In response to this indication, the social-networking service may send a "friend request" to the second user. If the second user confirms the "friend request," the social-networking service may create an edge 1306 connecting the first user's user node 1302 to the second user's user node 1302 in social graph 1300 and store edge 1306 as social-graph information in one or more data stores. In the example of FIG. 13, social graph 1300 includes an edge 1306 indicating a friend relation between user nodes 1302 of user "Amanda" and user "Bryan" and an edge indicating a friend relation between user nodes 1302 of user "Carla" and user "Bryan." Although this disclosure describes or illustrates particular edges 1306 with particular attributes connecting particular user nodes 1302, this disclosure contemplates any suitable edges 1306 with any suitable attributes connecting user nodes 1302. As an example and not by way of limitation, an edge 1306 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 1300 by one or more edges 1306.

In particular embodiments, an edge 1306 between a user node 1302 and a concept node 1304 may represent a particular action or activity performed by a user associated with user node 1302 toward a concept associated with a concept node 1304. As an example and not by way of limitation, as illustrated in FIG. 13, a user may "like," "attended," "played," "listened," "cooked," "worked at," or "watched" a concept, each of which may correspond to a edge type or subtype. A concept-profile page corresponding to a concept node 1304 may include, for example, a selectable "check in" icon (such as, for example, a clickable "check in" icon) or a selectable "add to favorites" icon.

Similarly, after a user clicks these icons, the social-networking service may create a "favorite" edge or a "check in" edge in response to a user's action corresponding to a respective action. As another example and not by way of limitation, a user (user "Carla") may listen to a particular song ("Across the Sea") using a particular application (SPOTIFY, which is an online music application). In this case, the social-networking service may create a "listened" edge 1306 and a "used" edge (as illustrated in FIG. 13) between user nodes 1302 corresponding to the user and concept nodes 1304 corresponding to the song and application to indicate that the user listened to the song and used the application. Moreover, the social-networking service may create a "played" edge 906 (as illustrated in FIG. 13) between concept nodes 1304 corresponding to the song and the application to indicate that the particular song was played by the particular application. In this case, "played" edge 1306 corresponds to an action performed by an external application (SPOTIFY) on an external audio file (the song "Across the Sea"). Although this disclosure describes particular edges 1306 with particular attributes connecting user nodes 1302 and concept nodes 1304, this disclosure contemplates any suitable edges 1306 with any suitable attributes connecting user nodes 1302 and concept nodes 1304. Moreover, although this disclosure describes edges between a user node 1302 and a concept node 1304 representing a single relationship, this disclosure contemplates edges between a user node 1302 and a concept node 1304 representing one or more relationships. As an example and not by way of limitation, an edge 1306 may represent both that a user likes and has used at a particular concept. Alternatively, another edge 1306 may represent each type of relationship (or multiples of a single relationship) between a user node 1302 and a concept node 1304 (as illustrated in FIG. 13 between user node 1302 for user "Edwin" and concept node 1304 for "SPOTIFY").

In particular embodiments, the social-networking service may create an edge 1306 between a user node 1302 and a concept node 1304 in social graph 1300. As an example and not by way of limitation, a user viewing a concept-profile page (such as, for example, by using a web browser or a special-purpose application hosted by the user's client system) may indicate that he or she likes the concept represented by the concept node 1304 by clicking or selecting a "Like" icon, which may cause the user's client system to send to the social-networking service a message indicating the user's liking of the concept associated with the concept-profile page. In response to the message, the social-networking service may create an edge 1306 between user node 1302 associated with the user and concept node 1304, as illustrated by "like" edge 1306 between the user and concept node 1304. In particular embodiments, the social-networking service may store an edge 1306 in one or more data stores. In particular embodiments, an edge 1306 may be automatically formed by the social-networking service in response to a particular user action. As an example and not by way of limitation, if a first user uploads a picture, watches a movie, or listens to a song, an edge 1306 may be formed between user node 1302 corresponding to the first user and concept nodes 1304 corresponding to those concepts. Although this disclosure describes forming particular edges 1306 in particular manners, this disclosure contemplates forming any suitable edges 1306 in any suitable manner.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

In the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible.

The invention claimed is:

1. A system, comprising:
   a non-transitory storage medium configured to store network conditions for a plurality of networks and locations; and
   server logic executable on a processor circuit, the server logic configured to:
      receive information regarding network conditions for a user device location from instances of one or more mobile applications operating in the plurality of networks and locations;
      determine network conditions for each of a plurality of networks and locations based upon detected usage of each of the mobile application instances operating in each of the plurality of networks;
      store the determined network conditions at a storage module;
      receive a request for content from a client device distinct from the server device and located remotely from the server device;
      in response to receiving the request for the content, select the content based upon at least the determined network conditions at the location of the client device from which the request has been received; and
      provide the content to the client device.

2. The system of claim 1, wherein the content includes one or more of advertising content, media content, social network content, messaging content, or gaming content.

3. The system of claim 1, wherein a high-quality version of the content and a low-quality version of the content are available to the server device, and selecting the content comprises selecting the low-quality version of the content when the determined network conditions indicate that the network conditions for the client device are poor.

4. The system of claim 1, wherein the content is provided to the content device using a plurality of networks as determined by the network conditions.

5. The system of claim 1, wherein network conditions include one or more of error rates, bandwidth, throughput, transmission delay, availability, or jitter.

6. The system of claim 1, wherein determining the content is further based upon cost information associated with one or more subscriber identify modules (SIMs) associated with the client device.

7. The system of claim 6, wherein the server device is further configured to:
   determine, based on the network conditions, that network performance is currently high;
   determine, based on the cost information, that a cost of the content to the user is currently low; and
   transmit an instruction to the client device to cache high-quality content.

8. A computer-implemented method, comprising:
   receiving information regarding network conditions for a user device location from instances of one or more mobile applications operating in a plurality of networks and locations;
   determining network conditions for each of a plurality of networks and locations based upon detected usage of each of the mobile application instances operating in each of the plurality of networks;
   storing the determined network conditions at a storage module;
   receiving, at a server device, a request for content from a client device distinct from the server device and located remotely from the server device;
   in response to receiving the request for the content, selecting the content based upon at least the determined network conditions at the location of the client device from which the request has been received; and
   providing the content to the client device.

9. The method of claim 8, wherein the content includes one or more of advertising content, media content, social network content, messaging content, or gaming content.

10. The method of claim 8, wherein a high-quality version of the content and a low-quality version of the content are available to the server device, and selecting the content comprises selecting the low-quality version of the content when the determined network conditions indicate that the network conditions for the client device are poor.

11. The method of claim 8, wherein the content is provided to the content device using a plurality of networks as determined by the network conditions.

12. The method of claim 8, wherein network conditions include one or more of error rates, bandwidth, throughput, transmission delay, availability, or jitter.

13. The method of claim 8, wherein determining the content is further based upon cost information associated with one or more subscriber identify modules (SIMs) associated with the client device.

14. The method of claim 13, further comprising:
   determining, based on the network conditions, that network performance is currently high;
   determining, based on the cost information, that a cost of the content to the user is currently low; and
   transmitting an instruction to the client device to cache high-quality content.

15. A non-transitory computer-readable storage medium including instructions that, when executed by a processor, cause a system to:
   receive information regarding network conditions for a user device location from instances of one or more mobile applications operating in a plurality of networks and locations;
   determine network conditions for each of a plurality of networks and locations based upon detected usage of each of the mobile application instances operating in each of the plurality of networks;
   store the determined network conditions at a storage module;
   receive a request for content from a client device distinct from the server device and located remotely from the server device;
   in response to receiving the request for the content, select the content based upon at least the determined network conditions at the location of the client device from which the request has been received; and
   provide the content to the client device.

16. The medium of claim 15, wherein the content includes one or more of advertising content, media content, social network content, messaging content, or gaming content.

17. The medium of claim 15, wherein a high-quality version of the content and a low-quality version of the content are available to the server device, and selecting the content comprises selecting the low-quality version of the content when the determined network conditions indicate that the network conditions for the client device are poor.

18. The medium of claim 15, wherein the content is provided to the content device using a plurality of networks as determined by the network conditions.

19. The medium of claim 15, wherein network conditions include one or more of error rates, bandwidth, throughput, transmission delay, availability, or jitter.

20. The medium of claim 15, wherein determining the content is further based upon cost information associated with one or more subscriber identify modules (SIMs) associated with the client device, wherein the instructions further comprise instructions for:
- determining, based on the network conditions, that network performance is currently high;
- determining, based on the cost information, that a cost of the content to the user is currently low; and
- transmitting an instruction to the client device to cache high-quality content.

* * * * *